Patented July 24, 1928.

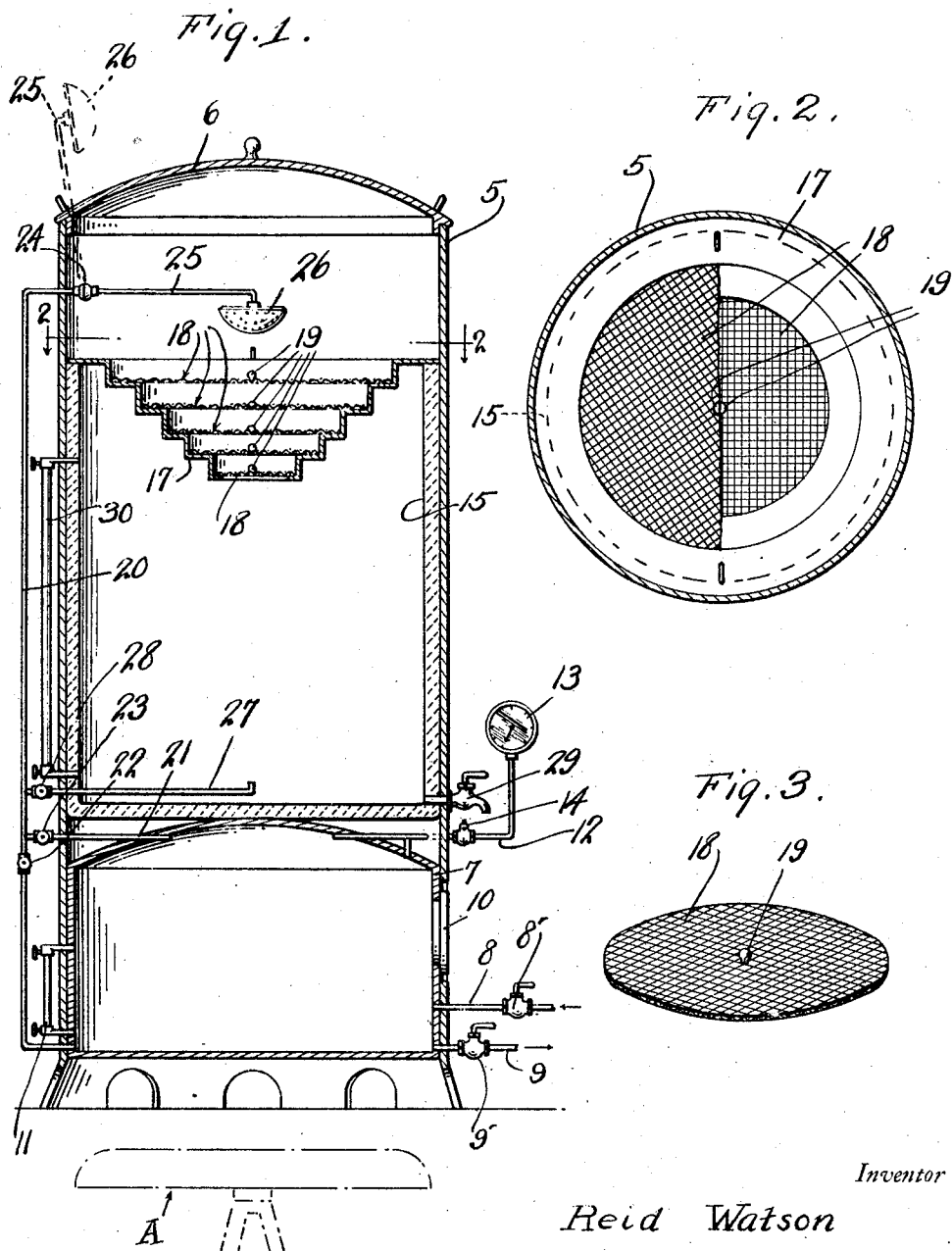

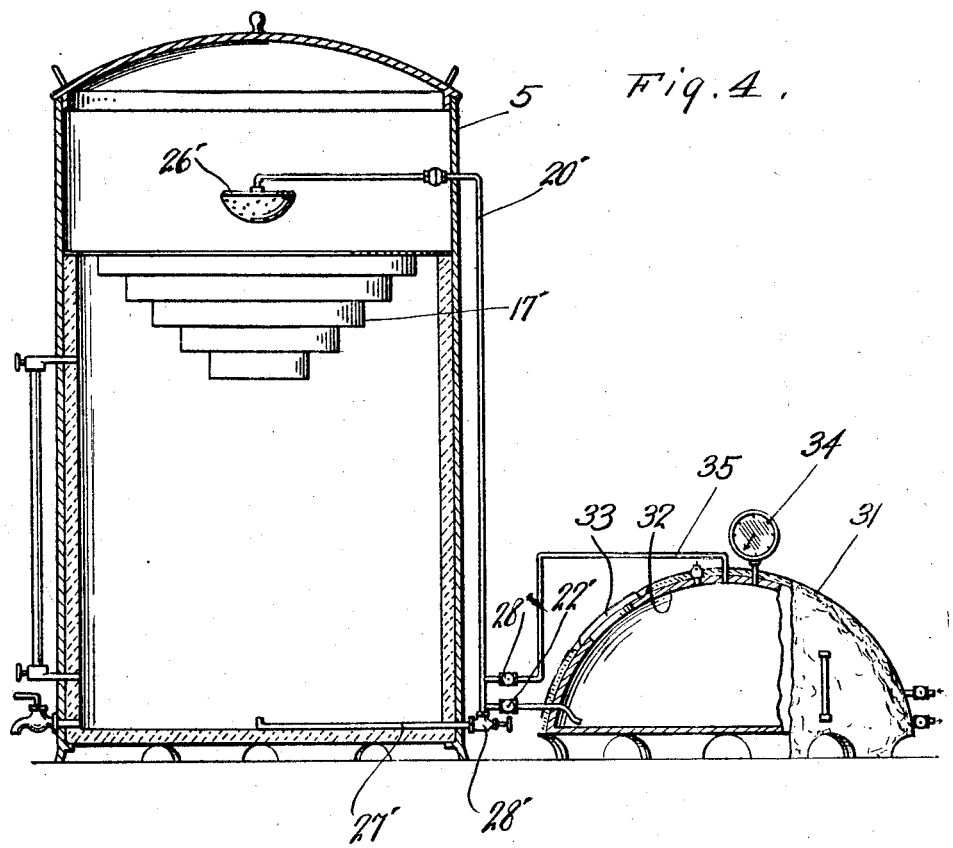

1,678,543

UNITED STATES PATENT OFFICE.

REID WATSON, OF LAWRENCEVILLE, NEW JERSEY.

COFFEE PERCOLATOR.

Application filed September 24, 1927. Serial No. 221,837.

This invention relates to new and useful improvements in coffee percolators of the relatively large capacity type usually employed in restaurants and hotels and aims to provide a highly novel and simple percolator wherein steam and water is caused to trickle through the coffee chamber resulting in the production of clear, pure and more tasty coffee than is now possible in the use of percolators now on the market.

The invention further aims to provide a device of this character wherein a plurality of chambers is provided for receiving coffee so that varying amounts thereof may be disposed within the device, dependent upon the nature of the coffee and the strength desired.

In the drawings wherein there is disclosed two embodiments of the present invention, Figure 1 is a detail vertical section through one type of percolator.

Figure 2 is a horizontal section taken substantially upon the line 2—2 of Figure 1 and looking downwardly.

Figure 3 is a perspective of one of the foraminous discs a plurality of which are provided for effecting the bottom walls of the plurality of coffee chambers, and, Figure 4 is a detail section of a modified form of percolator.

Now having particular reference to that form of the invention disclosed in Figures 1, 2 and 3, 5 designates a tank of relatively large capacity open at its upper end and provided with a suitable removable lid 6. Within the lower end of this receptacle there is a chamber 7 of heat retaining earthenware material leading into which is a water supply pipe 8 while leading from this chamber at its lower end is a water discharge pipe 9 within each of which is a valve 8' and 9' respectively. Obviously the receptacle 5 is to be disposed over a suitable burner A so that the water within the chamber 7 will be properly heated.

This chamber 7 is provided with a cleanout opening within which is normally disposed a plug 10 access to which may be had through an opening in the receptacle 5. Furthermore, this chamber 7 is provided with a water gage 11 while leading into the upper end thereof is a steam gage pipe 12 upon the outer end of which is a suitable gage 13 said pipe being equipped with a suitable flow-off valve 14.

Arranged within the receptacle 5 above the chamber 7 is an earthenware coffee receptacle 15 open at its upper end and being spaced at its upper end upon the upper open end of said receptacle 5. Removably disposed within the upper end of this earthenware receptacle 15 and depending therein is a stepped walled cylindrical chamber 17 open at its upper and lower end. This stepped wall construction provides a plurality of circular shoulders upon which are to be removably disposed discs of foraminous material 18 for cooperating with the various stepped portions of the chamber to provide a plurality of coffee containers. Preferably these discs 18 are constructed centrally with lifting knobs each of which is designated by the reference character 19 so that the same may be readily removed from their respective coffee chambers.

Leading from the bottom of the water chamber 7 and extending upwardly at the outer side of the receptacle 5 is a combined water and steam pipe 20 while leading into this pipe and communicating with the upper end of the chamber 7 is a steam pipe 21. Directly beneath this steam pipe 21 the pipe 20 is provided with a valve 22 while said steam pipe 21 is provided with a valve 23. The upper end of the pipe 20 leads into the receptacle 5 above the earthenware receptacle 15 while swivelly attached to said vertical pipe 20 within the receptacle 5 as at 24 is a pipe 25 the inner end of which is provided with a semi-spherical perforated chamber 26 through which the water and steam exhausts into the coffee chambers. Obviously steam generated into the chamber 7 will when the valve 23 is opened pass upwardly through the pipe 20 into the steam dome 26 while at the same time hot water from the bottom of the chamber 7 will pass upwardly through the pipe 20 when the valve 22 is open so that the hot water and steam will percolate through the coffee within the various coffee chambers.

The swivel joint 24 is provided in order that the steam dome 26 and its pipe 25 may be swung upwardly into the dotted line position in Figure 1 when the receptacle lid 6 is removed so that the chamber 17 as well as the foraminous disc 18 may be removed from the receptacle.

In order that coffee may be drawn from the earthenware receptacle 15 to permit the re-percolation thereof a horizontal pipe 27 leads into the lower end of the receptacle 15 and communicates at its outer end with the pipe 20. This pipe 27 is provided at the outer side of the receptacle 25 with a valve 28 which may be closed when it is not desired to re-percolate the coffee. By cutting off the valve 22 and opening the steam valve 23, the steam passing upwardly through the pipe 20 will act as an ejector for drawing the coffee from the receptacle to pass the same into the dome 26 whereupon it will be discharged into the various coffee chambers.

A suitable faucet 29 is provided for withdrawing the coffee from the coffee receptacle 15 while said receptacle is provided with a suitable level gage 30.

In the form of the invention shown in Figure 4, 5' represents a relatively large receptacle within which is an earthenware receptacle 15' while removably arranged within the upper end of this earthenware receptacle is a multi-coffee chamber 17' similar to that disclosed in Fig. 1.

In this form of the invention however, there is provided a semispherical chamber 31 to be disposed adjacent the receptacle 5' and within which is an earthenware lining 32. This lining as well as the chamber are provided with registering openings while normally arranged within the opening of the lining is a clean-out plug 33. Communicating with the interior of this chamber is a suitable steam gage 34. Leading from the top of the chamber is a steam discharge pipe 35 that communicates with a vertical pipe 20' at the outer side of the receptacle 5' that communicates at its upper end with a steam and water dome 26' within the receptacle 5' above the earthenware receptacle 15'. Leading from the bottom of this earthenware receptacle 15' is a coffee return pipe 27' that communicates at its outer end with the lower end of the pipe 20' and within which is a suitable control valve 28'. In this instance also the pipe 20' adjacent its lower end communicates with the interior of the chamber 31 adjacent the bottom thereof a suitable control valve 22' being provided whereby the water may be shut off from the pipe 20'. In the steam line 35 between the pipe 20' and the chamber 31 is a steam valve 28' and obviously the general operation of this device will be the same as that disclosed in Figure 1.

It will thus be seen that I have provided a highly novel, simple and extremely efficient coffee percolator that is well adapted for all of the purposes heretofore designated and even though I have herein shown and described the invention as consisting of certain detail structural elements, it is nevertheless to be understood that minor changes may be made therein without affecting the spirit and scope of the appended claim.

Having thus described my invention, what I claim as new is:—

In a percolating device of the character described, a water chamber, a coffee chamber, said water chamber adapted to be disposed over a suitable heating unit, a steam conducting pipe extending from the water chamber, said pipe having a discharge end within the upper portion of the coffee chamber, a branch pipe connecting the steam pipe with the bottom portion of the coffee chamber, whereby coffee from the bottom of the coffee chamber will be conducted through the steam pipe and into the upper portion of the coffee chamber, a coffee container arranged within the upper portion of the coffee chamber and under the discharge end of the steam pipe, said container being provided with a stepped wall converging toward the central opening in its bottom, and foraminous plates arranged within the coffee container and upon the steps formed in the wall of said container, said plate being adapted to support a quantity of coffee.

In testimony whereof I affix my signature.

REID WATSON.